United States Patent
Wang

(10) Patent No.: US 12,443,526 B2
(45) Date of Patent: Oct. 14, 2025

(54) ADAPTIVE CACHING FRAMEWORK

(71) Applicant: Oracle International Corporation, Redwood Shores, CA (US)

(72) Inventor: Teng Wang, Nashua, NH (US)

(73) Assignee: Oracle International Corporation, Redwood Shores, CA (US)

( * ) Notice: Subject to any disclaimer, the term of this patent is extended or adjusted under 35 U.S.C. 154(b) by 75 days.

(21) Appl. No.: 18/128,802

(22) Filed: Mar. 30, 2023

(65) Prior Publication Data
US 2024/0330179 A1    Oct. 3, 2024

(51) Int. Cl.
G06F 12/0802    (2016.01)

(52) U.S. Cl.
CPC ...... *G06F 12/0802* (2013.01); *G06F 2212/60* (2013.01)

(58) Field of Classification Search
CPC .................. G06F 12/0802; G06F 2212/60
See application file for complete search history.

(56) References Cited

U.S. PATENT DOCUMENTS

| | | | |
|---|---|---|---|
| 4,315,312 A | | 2/1982 | Schmidt |
| 10,114,751 B1* | | 10/2018 | Faith ............... G06F 12/0871 |
| 2016/0117241 A1* | | 4/2016 | Shah ............... G06F 12/0895 |
| | | | 711/119 |
| 2019/0004709 A1* | | 1/2019 | Wang ............... G06F 3/067 |
| 2021/0157725 A1* | | 5/2021 | Barbalho ......... G06F 12/0802 |
| 2021/0182193 A1* | | 6/2021 | Na ................... G06F 12/0831 |

OTHER PUBLICATIONS

"Page Cache," Wikipedia article, URL: https://en.wikipedia.org/wiki/Page_cache, last updated Mar. 25, 2023.
"Database Performance Tuning Guide," Oracle Help Center, URL: https://docs.oracle.com/database/121/TGDBA/tune_buffer_cache.htm, Copyright 2017.
Nishtala, R., Fugal, H., Grimm, S., Kwiatkowski, M., Lee, H., Li, H.C., McElroy, R., Paleczny, M., Peek, D., Saab, P. and Stafford, D., 2013. "Scaling Memcache at Facebook". In 10th USENIX Symposium on Networked Systems Design and Implementation (NSDI 13) (pp. 385-398).
"LevelDB," Wikipedia Article, URL: https://en.wikipedia.org/wiki/LevelDB, last updated Feb. 5, 2023.
Chang, F., Dean, J., Ghemawat, S., Hsieh, W.C., Wallach, D.A., Burrows, M., Chandra, T., Fikes, A. and Gruber, R.E., 2006. "Bigtable: A Distributed Storage System for Structured Data." ACM Transactions on Computer Systems (TOCS), 26(2), pp. 1-26.

(Continued)

*Primary Examiner* — Kenneth M Lo
*Assistant Examiner* — Jonah C Krieger
(74) *Attorney, Agent, or Firm* — Vista IP Law Group, LLP

(57) ABSTRACT

Disclosed is an improved approach to implement caching. An adaptive and performance aware caching framework is provided that complements the existing state-of-the-art caching algorithms. Instead of using fixed-sized cache unit sizes, the approach adaptively switches to a cache unit size that incurs the lowest performance penalty, thereby yielding faster I/O and improved system performance.

18 Claims, 16 Drawing Sheets

(56) References Cited

OTHER PUBLICATIONS

Kumar, Snehasish, et al. "Amoeba-cache: Adaptive blocks for eliminating waste in the memory hierarchy." 2012 45th Annual IEEE/ACM International Symposium on Microarchitecture. IEEE, 2012.
Veidenbaum, A.V., Tang, W., Gupta, R., Nicolau, A. and Ji, X., May 1999. Adapting cache line size to application behavior. In Proceedings of the 13th international conference on Supercomputing (pp. 145-154).
Harter, T., Borthakur, D., Dong, S., Aiyer, A., Tang, L., Arpaci-Dusseau, A.C. and Arpaci-Dusseau, R.H., 2014. Analysis of {HDFS} Under {HBase}: A Facebook Messages Case Study. In 12th USENIX Conference on File and Storage Technologies (FAST 14) (pp. 199-212).
"Database Caching Strategies Using Redis," AWS, Archived Paper, dated May 2017.
"TutorialsPoint: Simply Easy Learning," Redis, copyright 2018.

\* cited by examiner

ADAPTIVE CACHING FRAMEWORK

BACKGROUND

Caching is a technique widely adopted by the modern computing systems for accelerating data movement across multiple storage layers. The core design philosophy of a caching system is to hold the frequently accessed data on the faster storage layer, in order to leverage its superior performance benefit, while leaving the less frequent data on the slower storage layer, which typically has larger capacity.

Software caches are generally built from fast storage devices, such as DRAM and NVRAM, which are used to temporarily cache the data of the slower and persistent storage, such as hard disk drives (HDDs) and solid-state storage drives (SSDs). One common approach to implement software caches is where the cache is built from cache blocks of the same fixed size. For instance, in the operating system page cache, the block size is fixed to a page size. In the context of database buffer caches, the block sizes may be fixed to one or multiple page sizes. Almost all such software caches assume that the data requests follow some measure of spatial locality, where the objects in the same cache block tend to be accessed together in a short period of time.

A hardware cache, such as a CPU cache, may be implemented with a variable block size, although these cache systems are typically designed under stringent constraints imposed by limited SRAM capacity, and as such their effectiveness may be compromised. For example, Amoeba-Cache is an approach which clusters together the words that have been requested and are spatially close to each other, and then selects a block size that best fits each cluster. This design improves the cache utilization by using block sizes that are best aligned with the applications' spatial locality. However, this spatial locality-based block size selection has multiple drawbacks. First, in order to cluster the words, it needs to allocate one access bit for each word in a bitmap in order to determine the words that are requested and are close to each other for clustering; it also needs to dynamically coalesce and split the cache blocks in order to fit the applications' evolving spatial locality. This incurs significant metadata storage and management cost. Second, rigorously aligning the block size with applications' spatial locality oftentimes yield suboptimal I/O performance. For instance, when two blocks are non-contiguous but close to each other, two separate I/O requests on the lower-level storage are needed. This often takes a longer amount of time than loading them together in one larger request that spans the range of both blocks, a common I/O optimization named data sieving.

Therefore, existing cache systems are generally built on the assumption of a fixed cache block size, or on the assumption that the I/O requests that are issued to the system exhibit temporal and spatial locality. In order to exploit the spatial locality, existing cache systems generally load more data than requested by the applications, such as a block instead of a word in the CPU cache, or a page instead of a few bytes in the page cache. In addition, many existing cache systems adopt fixed cache block size. Consequently, the cache efficiency is mainly dependent on the hit/miss ratio, where a higher value of miss ratio indicates lower I/O performance, as more blocks must be loaded from the slower storage layer. However, using fixed block sizes also sacrifices the potential performance benefit of using variable block sizes, especially when applications' I/O requests only touch a small fraction of the block.

Thus, there is a need for an improved approach to implement caching that improves upon and addresses the issues identified above.

SUMMARY

Embodiments of the invention provides an improved approach to implement caching. According to some embodiments, the invention proposes an adaptive and performance aware caching framework that complements the existing state-of-the-art caching algorithms. Instead of using fixed-sized cache unit sizes, the invention adaptively switches to a cache unit size that incurs the lowest performance penalty, thereby yielding faster I/O and improved system performance.

Further details of aspects, objects, and advantages of the invention are described below in the detailed description, drawings, and claims. Both the foregoing general description and the following detailed description are exemplary and explanatory, and are not intended to be limiting as to the scope of the invention.

BRIEF DESCRIPTION OF THE FIGURES

The drawings illustrate the design and utility of some embodiments of the present invention. It should be noted that the figures are not drawn to scale and that elements of similar structures or functions are represented by like reference numerals throughout the figures. In order to better appreciate how to obtain the above-recited and other advantages and objects of various embodiments of the invention, a more detailed description of the present inventions briefly described above will be rendered by reference to specific embodiments thereof, which are illustrated in the accompanying drawings. Understanding that these drawings depict only typical embodiments of the invention and are not therefore to be considered limiting of its scope, the invention will be described and explained with additional specificity and detail through the use of the accompanying drawings in which.

DETAILED DESCRIPTION OF THE EMBODIMENTS OF THE INVENTION

Various embodiments are described hereinafter with reference to the figures. It should be noted that the figures are not necessarily drawn to scale. It should also be noted that the figures are only intended to facilitate the description of the embodiments, and are not intended as an exhaustive description of the invention or as a limitation on the scope of the invention. In addition, an illustrated embodiment need not have all the aspects or advantages shown. An aspect or an advantage described in conjunction with a particular embodiment is not necessarily limited to that embodiment and can be practiced in any other embodiments even if not so illustrated. Also, reference throughout this specification to "some embodiments" or "other embodiments" means that a particular feature, structure, material, or characteristic described in connection with the embodiments is included in at least one embodiment. Thus, the appearances of the phrase "in some embodiments" or "in other embodiments," in various places throughout this specification are not necessarily referring to the same embodiment or embodiments.

Embodiments of the invention provide an improved approach to implement caching. According to some embodiments, the invention provides an adaptive and performance aware caching framework. Instead of using fixed-sized cache unit sizes, the invention adaptively switches to a cache unit size that incurs the lowest performance penalty, thereby yielding faster I/O and improved system performance. The inventive approach is also synergic with the existing caching algorithms, in that existing caching algorithms can be fit into its framework, which dynamically picks up the best cache unit size.

For the sake of explanation and without the intent of limitation, the below description may refer to a cache unit as a block. It is noted, however, that the term block may be applicable to mean any appropriate or usable type of cache unit (e.g., block in CPU cache, page in page cache) and therefore is not intended to be limiting to a specific type of size of a cache unit unless expressly claimed as such.

Figure 1:
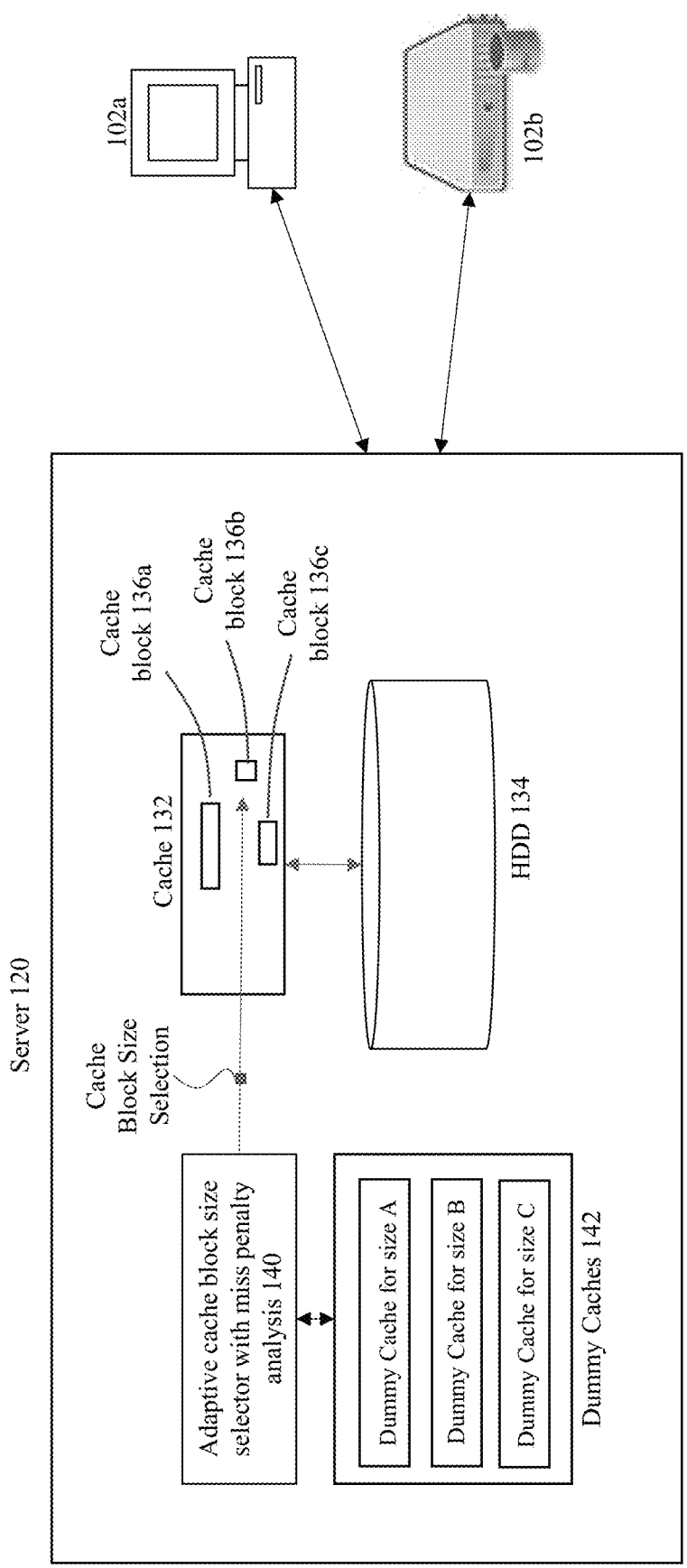
FIG. 1 shows an architecture of a system to implement some embodiments of the invention.

FIG. 1 shows an architecture of a system to implement some embodiments of the invention. The system includes a server 120 that manages the storage of data in one or more datastores. The datastore for the server 120 comprises any combination of hardware and software that allows for ready access to the data that is located at a computer readable storage device. For example, the datastore could be implemented as computer memory operatively managed by an operating system. The data in the datastore could also be implemented as database objects and/or files in a file system. In the current embodiment, the server 120 includes a cache 132 comprising one or more fast-access data devices, such as DRAM and NVRAM, which are used to temporarily cache the data of the slower and persistent storage 134, such as hard disks (HDDs) or solid-state storage devices (SSDs).

One or more users or applications use one or more access stations 102*a* or 102*b* to interact with the server 120. The access stations 102*a* or 102*b* comprise any type of computing station that may be used to operate or interface with the server 120. Examples of such access or user stations include, for example, workstations, personal computers, mobile devices, remote computing terminals, servers, cloud-based services, or applications. The access/user station may comprise a display device, such as a display monitor, for displaying a user interface to users at the station. The access/user station may also comprise one or more input devices for the user to provide operational control over the activities of the architecture, such as a mouse or keyboard to manipulate a pointing object in a graphical user interface to generate user inputs.

Data requests are sent to the server 120 to access the data held by the system in the HDD 134. Some of the data within HDD 134 may be temporarily held in cache 132. When a data request is received, an initial search is made of the cache 132 to determine if the requested data can very quickly be served for the data request from the cache 132. The situation where the requested data is found within the cache is referred to as a "cache hit". If the requested data is not found within cache 132, then this situation is referred to as a "cache miss". A cache miss will require the data to be retrieved from the HDD 134, often requiring a much longer amount of time to retrieve and serve the data back to the requester as compared to the time and cost to serve the data from the cache 132.

As is evident, it is therefore desirable to configure the system such that there is a greater likelihood of a cache hit when a data request is received. One way to increase the likelihood of a cache hit is to tailor the size of the size of the cache unit within the cache 132 to make it more likely that a desired data item for a data request will be found in cache. Each chunk of memory within the cache 132 is organized as a block having a given block size. The specific block size that is used to store content within the cache 132 may have a measurable impact upon the performance of the caching system. This is because certain types of applications that seek to access data may be associated with certain usage patterns and data affinities that may affect the type of content to be requested, and hence may correlate to different size units of data that may cause a cache to operate more or less efficiently. For instance, applications that request certain types of sequential I/Os, large volume data transfers, or multi-media may generally correspond to more efficient caching if large block sizes are used, whereas finer-granularity data accesses for file systems or databases may operate better with caching having relatively smaller cache block sizes.

Embodiments of the invention provide an approach to implement adaptive sizing of block sizes in the cache 132. Instead of using a fixed block size, multiple block sizes may be employed within cache 132. This figure shows three different blocks 136*a*, 136*b*, and 136*c* having three different block sizes, respectively, within cache 132. While the current explanation of the invention shows three different block sizes, it is noted that the inventive concepts described herein may be applicable to implement any number of different block sizes within a cache.

The specific block size that is selected to hold data within cache 132 may be adaptively identified, e.g., using a performance-aware caching framework. The performance aware framework may include an adaptive cache block selector 140 that performs a miss penalty analysis to determine the optimal cache block size. A set of dummy caches 142 are maintained that correspond to the cache 132. The dummy caches do not hold all of the real data from the real cache 132, but instead include enough dummy data, metadata, synthesized data, and/or summary data so that an accurate analysis can be performed to estimate the miss penalty for a given time period for each of the candidate cache sizes. This analysis would therefore allow the adaptive cache block selector 140 to select the correct cache block size for a subsequent time period.

Figure 2:
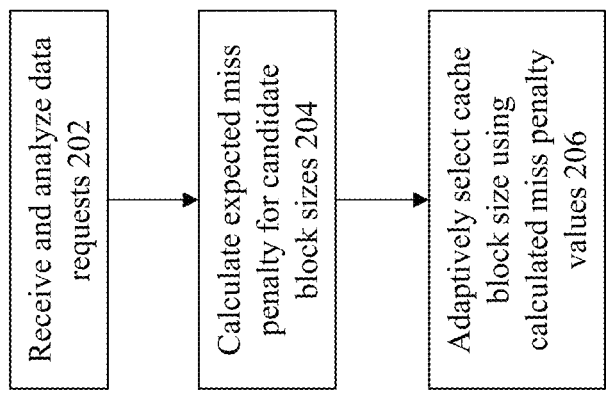
FIG. 2 shows a high-level flowchart of some embodiments of the invention for adaptively determining a cache block size.

FIG. 2 shows a high-level flowchart of some embodiments of the invention for adaptively determining a cache block size. At 202, data requests are received and analyzed over one or more time periods. During these time period(s), the data requests are processed using specific cache block sizes that correspond to actual cache hit and miss circumstances. However, what is notable is that analysis is also being performed on a range of candidate cache block sizes, even ones that are not actively selected for use as the current cache block size for the current cache.

At 204, the analysis of the candidate block sizes is used to calculate the expected miss penalty for each of the candidate cache block sizes. The term "miss penalty" generally refers to the penalty that is expected or estimated to be incurred upon the occurrence of a cache miss at a given cache block size.

At 206, the calculated miss penalty values are then used to select the active cache block size. This process is adaptive since, depending upon specific workload demands and performance estimates at given timeframes, it is possible that the optimal cache block size may change over time, and therefore the cache may adaptively change its selected cache block size to best match the current needs of the system.

Therefore, instead of selecting block sizes based on static block sizes or based upon only hit/miss ratio, the current embodiment adaptively selects the block size with the least miss penalty, which directly yields higher I/O performance. This approach is also synergic with existing caching algorithms, in that existing caching algorithms can be fit into its framework, which dynamically picks up the best block size for them.

Figure 3:
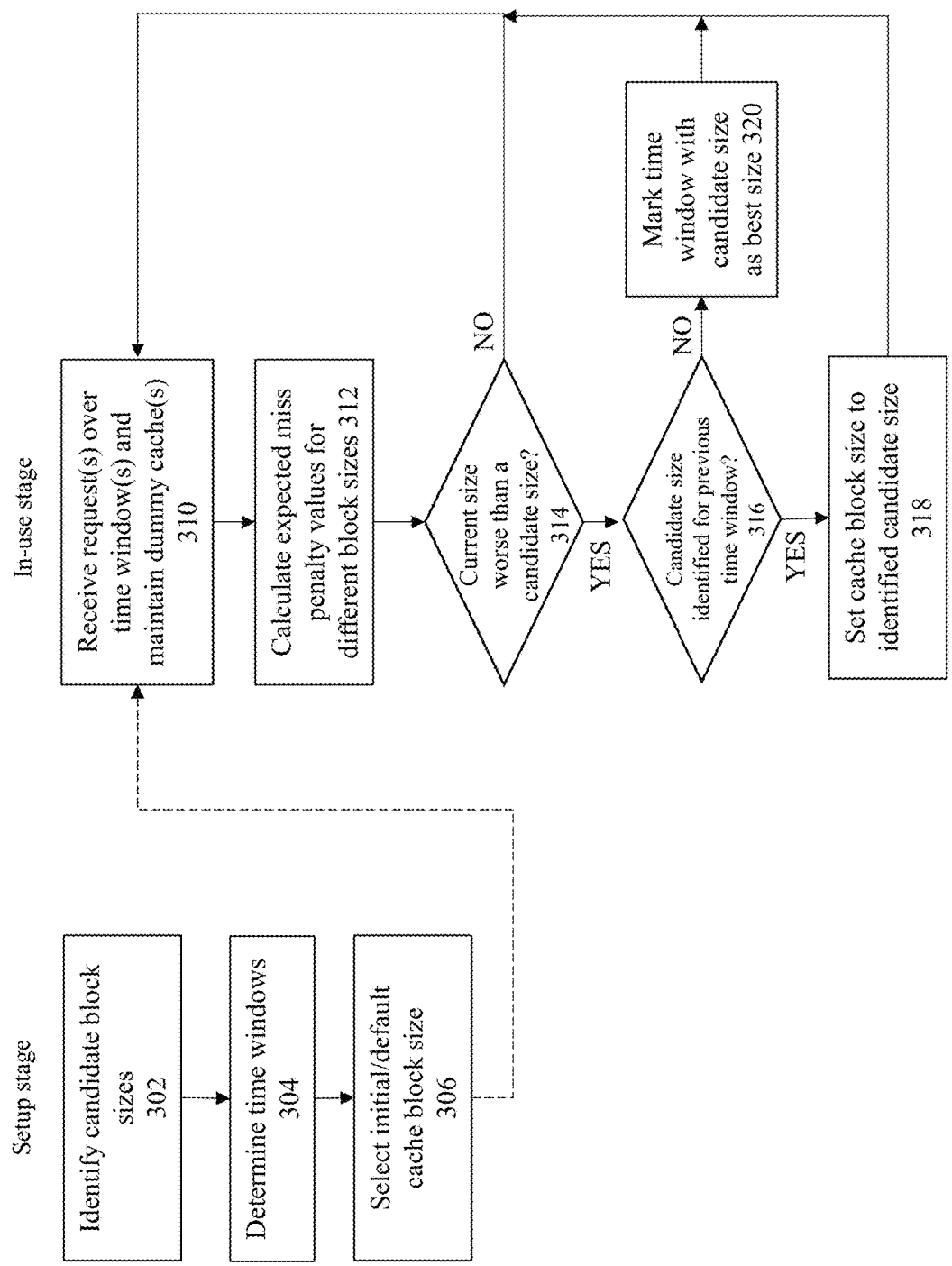
FIG. 3 shows a detailed process flow of actions that may be taken according to embodiments of the invention for adaptively selecting a cache block size.

FIG. 3 shows a detailed process flow of actions that may be taken according to embodiments of the invention for adaptively selecting a cache block size. The general idea is to divide the whole timespan of caching into units of time windows, and to adaptively monitor the expected miss penalty of a set of candidate block sizes across each time window. The block size that consistently yields the least miss penalty across the last N (2 by default) time windows is promoted to be the active block size.

At 302, candidate block sizes may be identified during an initial setup stage. It is noted that any number of candidate block sizes may be selected. In some embodiments, the candidate block sizes are determined empirically based on the use cases, e.g., based upon known stripe/page sizes for storage devices/systems. For instance, for I/O workloads on file systems or databases, recommended candidates may include for example, 64 KB, 256 KB and 1 MB. This is because 64 KB is a common stripe size small enough to be a multiple of page sizes, and 1 MB is a common stripe size large enough to drive the IO pipeline of the lower layer storage devices. 256 KB would be an appropriate size that is between these other two candidate sizes, that is four times the size of 64 KB, and where 1 MB is in turn four times the candidate 256 KB size.

At 304, time windows may be determined for the analysis processes. The time window may be measured based upon the expected or measured the I/O request counts. In some embodiments, the time windows are determined using the formula "nC/R (n>=2)", where "C" is the cache size, "R" is the average requested data size for each I/O request, and "n" corresponds to a multiplying factor. One reason for using the "n" value is to ensure that enough requests are factored into the calculations to "warm up" the cache in the event of periods of less data requests or during a period for the initial set of calculations. In a particular embodiment, the "n" value I defaulted to "2". In some embodiments, the "n" value may not be fixed, but instead may change over time, e.g., where the "n" value is different once the system has already warmed up, or where different values for "n" may apply during periods of high activity versus periods of low activity. In some embodiments, the average request size R is calculated by using either offline statistics or online statistics, where the system tracks the requested data size of each request, and then summing them up and obtain an average.

In an alternative approach, the system does not need to calculate the average request size in order to determine the time window. In this approach, the system tracks the size of data requested by each I/O request, and then sums them up until their aggregate sizes reach nC. For example, consider if the cache size is 8, and the size of the requested data for each IO request is: 2, 3, 5, 4, 1, 4, 2, 3, 5, 1, 2. When n is set to 2, then nC is 2*8=16, and therefore these requests can be divided into following time windows: (a) 2 3 5 4 1=>time window1, as their aggregate size is 15, adding the followed request (sized 4) will exceed 16; (b) 4 2 3 5 1=>time window 2, as their aggregate size is 15, adding the followed request (sized 2) will exceed 16; (c) 2=>time window3. If the data size requested by an IO request is even larger than the cache size, which is an extreme case, then the system can ignore these without counting this data into the calculations.

At 306, an initial and/or default cache block size is selected. Any suitable approach may be used to select the initial/default cache block size. For example, historical usage or statistical data may be used to select a cache block size that was used for a given workload or system configuration in the past, or which is deemed to be appropriate for future workloads of certain types or configurations.

During the in-use stage, at 310, data requests are received at the system over identified time periods. The data requests may be received from any application or user that seeks to access data stored within the system. The data requests are processed and handled to provide data from either the cache or the underlying persistent storage device.

During this time period, a set of dummy caches are maintained for the candidate cache block sizes. This dummy cache differs from the active cache in that, instead of operating on the real blocks, it only tracks their block numbers and loads/evicts these block numbers using the same cache algorithm. The dummy caches would essentially include simulated/dummy disk blocks of the appropriate block size for each dummy cache, e.g., a first dummy cache would include simulated/dummy blocks having 64 KB sizes, a second dummy cache includes simulated/dummy blocks having 256 KB block sizes, a third dummy cache would include simulated/dummy blocks having 1 MB block sizes, etc.

In this way, cache misses and cache hits for the candidate block sizes can be accurately derived in the same manner as the active block size, without incurring excessive costs to maintain the dummy caches. For example, for a dummy cache, disk block IDs 1 2 3 4 5 are maintained in the dummy cache-without actually storing the real data for these disk block IDs in the dummy cache. During the real usage of the system, disk block ID 6 may come in and replace disk block ID 1, where disk block 6 is not really loaded, just block ID 6 with an integer value that is tracked. But for the real cache, disk block 6's data is loaded into the cache, which costs much more than an integer value that is configured in the dummy cache. In fact, it is the cache block (64 KB, 256 KB, 1 MB in the current example) that contains the disk block (e.g., 4 KB) that is loaded into the cache, which is even larger than the disk block. Here, the block ID represents the physical address of the hard disk. It is noted that the system may use different addressing schemes for a different media or a software system.

At 312, expected miss penalty values are calculated for the different candidate cache block sizes. In some embodiments, the expected miss penalty is calculated by using the formula "$T\_miss*C\_miss/C\_req$", where $C\_miss$ and $C\_req$ are the miss count and the request count within the time window, respectively, and their quotient, $C\_miss/C\_req$ is the miss ratio. $T\_miss$ is the average miss time (e.g., miss penalty) incurred by loading one block with the specified block size from the slower storage layer. The expected miss penalty is adaptively calculated for each candidate block size in each time window (e.g., expected miss penalty=miss ratio multiply by miss penalty of the given block size).

In order to calculate C_miss/C_req, the contents of the dummy caches that were maintained for each candidate block size are used. As previously noted, the dummy caches differ from the active cache in that, instead of operating on the real blocks, these dummy caches track block numbers and load/evict these block numbers using the same cache algorithm. In this way, T_miss and C_miss for the candidate block sizes can be accurately derived in the same manner as the active block size, without incurring additional miss penalties.

For example, consider if the cache size is 8, the disk block size is 2, and the cache block size is 4. It is noted that the cache block size is the variable block size discussed in this example (e.g., 64 KB, 256 KB and 1 MB as stated above). The disk block size is a fixed number, typically 4 KB or 512 B. There may be a sequence of data requests that request the disk blocks B0, B5, B2, B7, B8, B9. This example may use FIFO (first in first out) as a cache algorithm, and it is noted that each request may span multiple disk blocks, although the current example only uses one block for the sake of simplicity and explanation. The request for disk block 0 (B0) result in B0 (size 2) and B1 (size 2) loaded into the cache. Since the cache block size is 4, which can accommodate two contiguous disk blocks, the cache will now contain: "B0 B1", with C_miss (miss count) being 1. Next, a request for B5 result in: "B0 B1 B5 B6". Now the cache is full, as its size is 8, C_miss becomes 2. Following FIFO algorithm, the next request on B2 will result in: "B5 B6 B2 B3". The cache block containing B0 and B1 is evicted and replaced by B2 and B3. C_miss at this point becomes "3". Then, B7 comes, and it results in the eviction of B5 and B6: "B2 B3 B7 B8". At this point, C_miss becomes "4". Then, B8 comes, and there is a hit. Finally, B9 comes, and it evicts B2 and B3: "B7 B8 B9 B10". At this point, C_miss becomes "5". It can therefore be seen that simply tracking the disk block ID is sufficient for deriving C_miss for a dummy cache.

In order to calculate T_miss, a profiling phase is employed. For example, the profiling phase may occur right after the cache is initialized, which calculates T_miss for each block size by selecting each of them as the active block size for a time window, and then deriving its T_miss as the quotient of the accumulated miss time and miss count. The candidate block sizes are selected in a one-by-one fashion, where T_miss of each block size is measured across one or more time windows until T_miss stabilizes. The measurement of these candidates can be done in either a sequential or an interleaved manner. For example, for 64 KB, 256 KB and 1 MB block sizes, the system can use 64 KB as a block size first, and run it across one or multiple time windows, and calculate C_miss and total miss time T of this block size until T_miss stabilizes around 5% variances, where T_miss is calculated as T/C_miss. Then, the system can use 256 KB as a block size, and measure its C_miss and total miss time T until T_miss stabilizes. Thereafter, the system proceeds to 1 MB, and performs the same steps to obtain T_miss for the 1 MB block size.

At 314, a determination is made whether the expected miss penalty of any of the candidate cache block sizes is better than the currently active cache block size. This step is performed by comparing the expected missing penalty values that were identified for each of the possible cache block sizes. If the currently active block size has the lowest penalty, then this indicates that the currently active cache block size is the best choice for the cache block size, and therefore the process will return back to 310 to continue processing without taking any additional actions. However, if the currently active block size does not have the lowest penalty, then this indicates that another candidate cache block size may be a better choice for the cache block size for the cache.

A determination is then made at 316 whether the candidate block size that is currently identified was also identified in the preceding time window as being the best candidate cache block size. The reason for this check is because the current embodiment seeks to check whether a candidate block size has been identified as the best cache block size in at least two consecutive time windows before changing the active cache block size to the newly identified block size. Therefore, if the identified block size was also identified as the best block size in the immediately preceding time period, then at 318, the identified candidate cache block size is now set as the new active cache block size for the cache. However, if a different cache block size was identified as optimal for the preceding time period, then at 320, a record is made of the identified cache block size with respect to the current time period as having the lowest penalty value, and the process proceeds back to 310 to process the next time period. It is noted that any suitable number of consecutive time periods may be identified as appropriate for changing the active cache block size, and that the use of two consecutive time periods in the current embodiment is not limiting as to the scope of the invention.

Figure 4A:
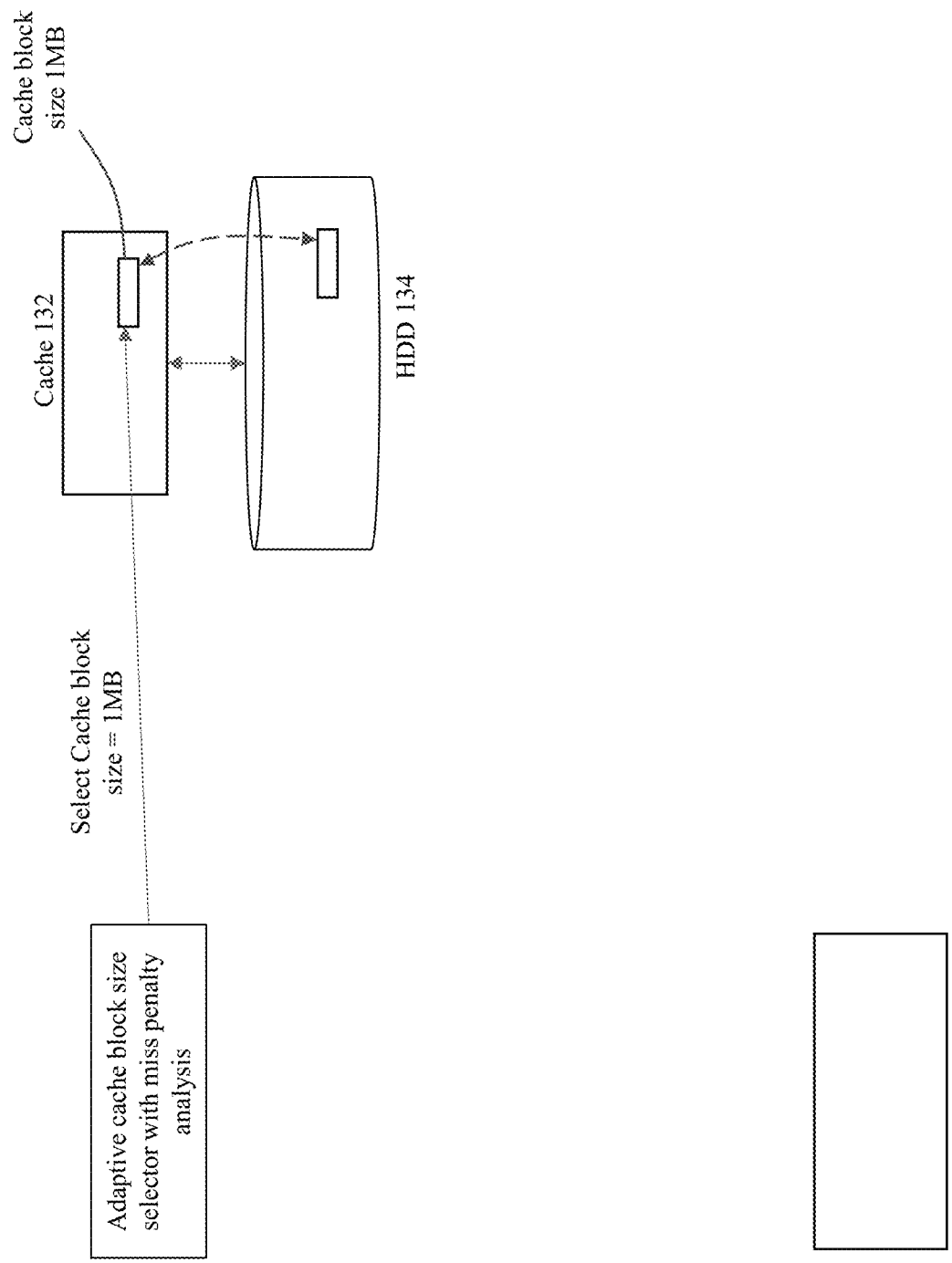
FIGS. 4A-K provide an illustrative example of this approach to implement adaptive selection of a cache block size.

FIGS. 4A-K provide an illustrative example of this approach to implement adaptive selection of a cache block size. FIG. 4A shows a system that includes a cache 132 and an HDD 134. Assume that the candidate cache block sizes for the cache 132 are 64 KB, 256 KB, and 1 MB. As shown in this figure, the currently active cache block size is 1 MB. Therefore, a cache block held in cache 132 is sized to be 1 MB in size when holding content from the HDD 134.

Figure 4B:
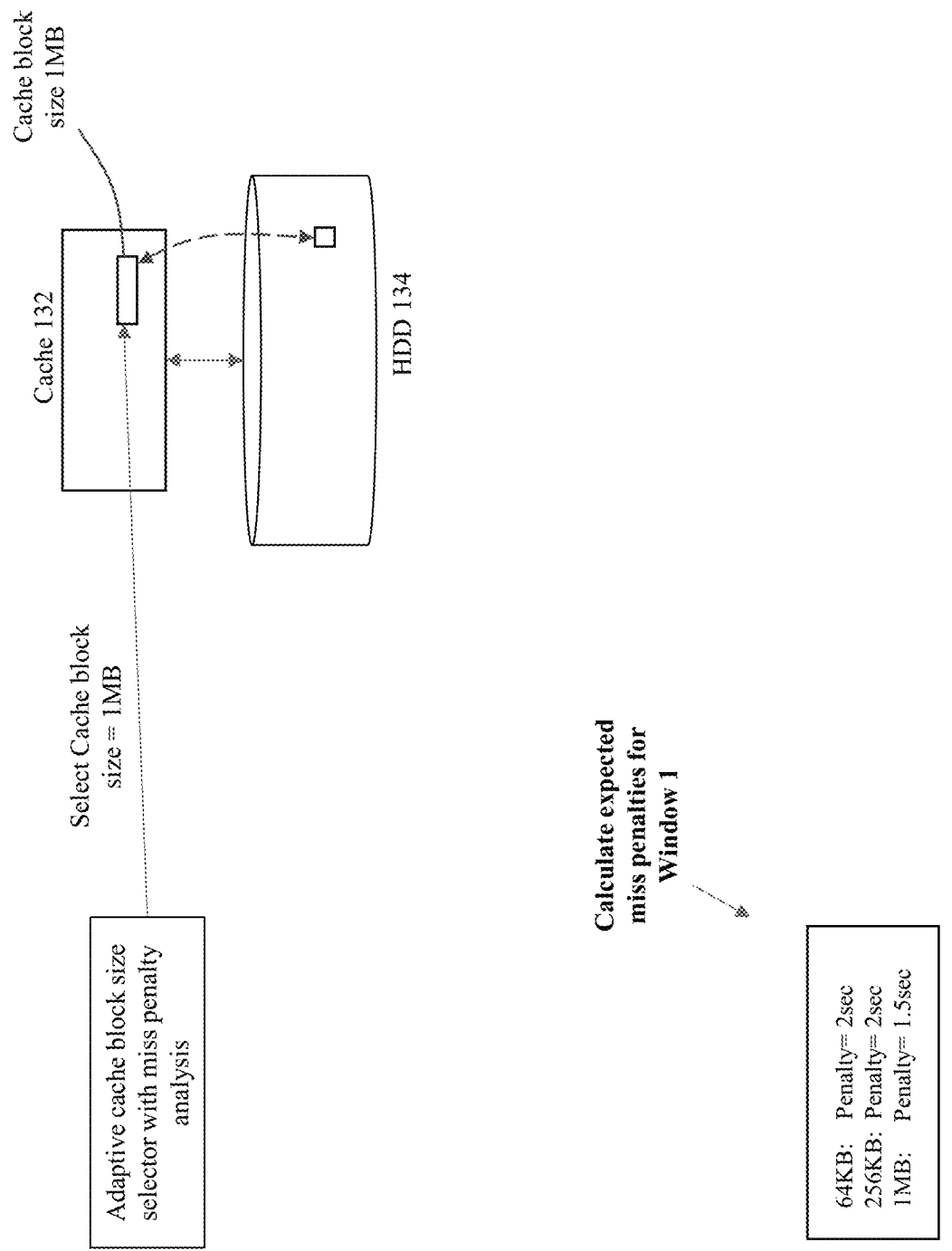
Figure 4C:
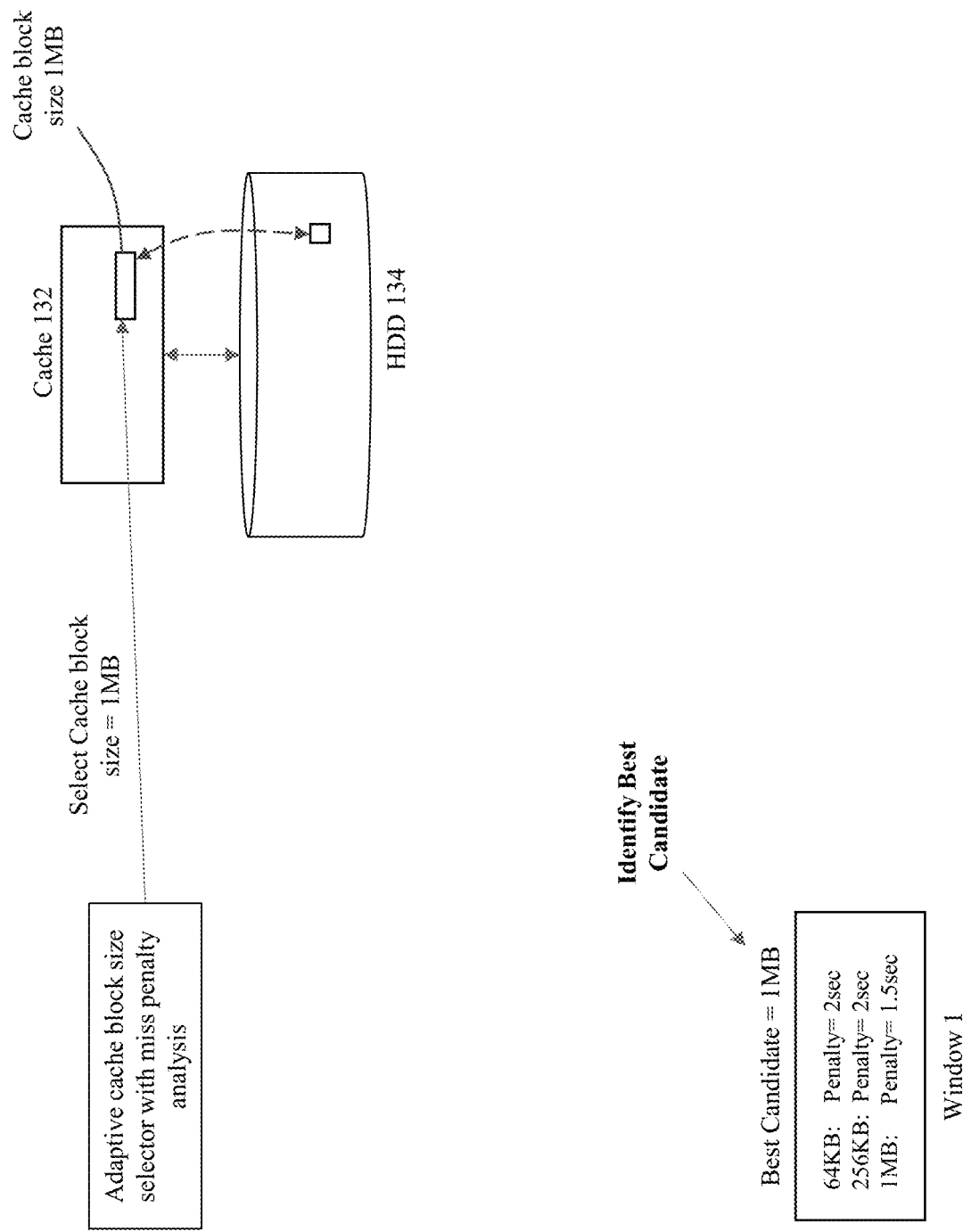

As shown in FIG. 4B, during processing for data requests in Time Window 1, expected miss penalties are calculated for each of the candidate cache block sizes. In particular, the expected miss penalty for the 64 KB size is 2 seconds, the expected miss penalty for the 256 KB size is 2 seconds, and the expected miss penalty for the 1 MB size is 1.5 seconds. As reflected in FIG. 4C, this shows that the expected miss penalty for the 1 MB size is the lowest for this time period, indicating that the currently active cache block size (1 MB) is indeed the best choice for this current time window. Since the currently active cache block size is exactly the same as the size identified as the best cache block size for this time window, this means that nothing further needs to happen for any changes at this time, except to note the 1 MB value as being the best candidate.

Figure 4D:
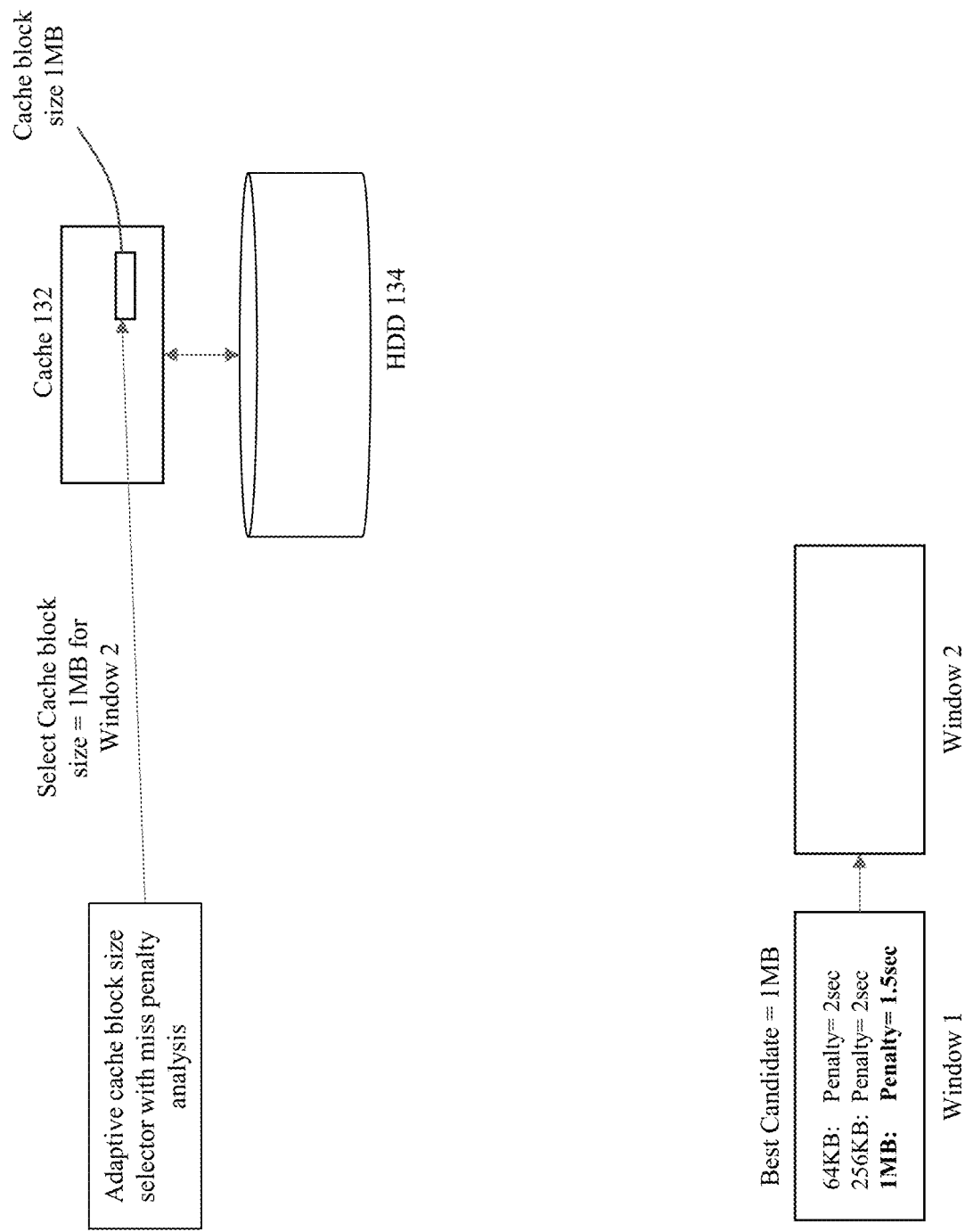
Figure 4E:
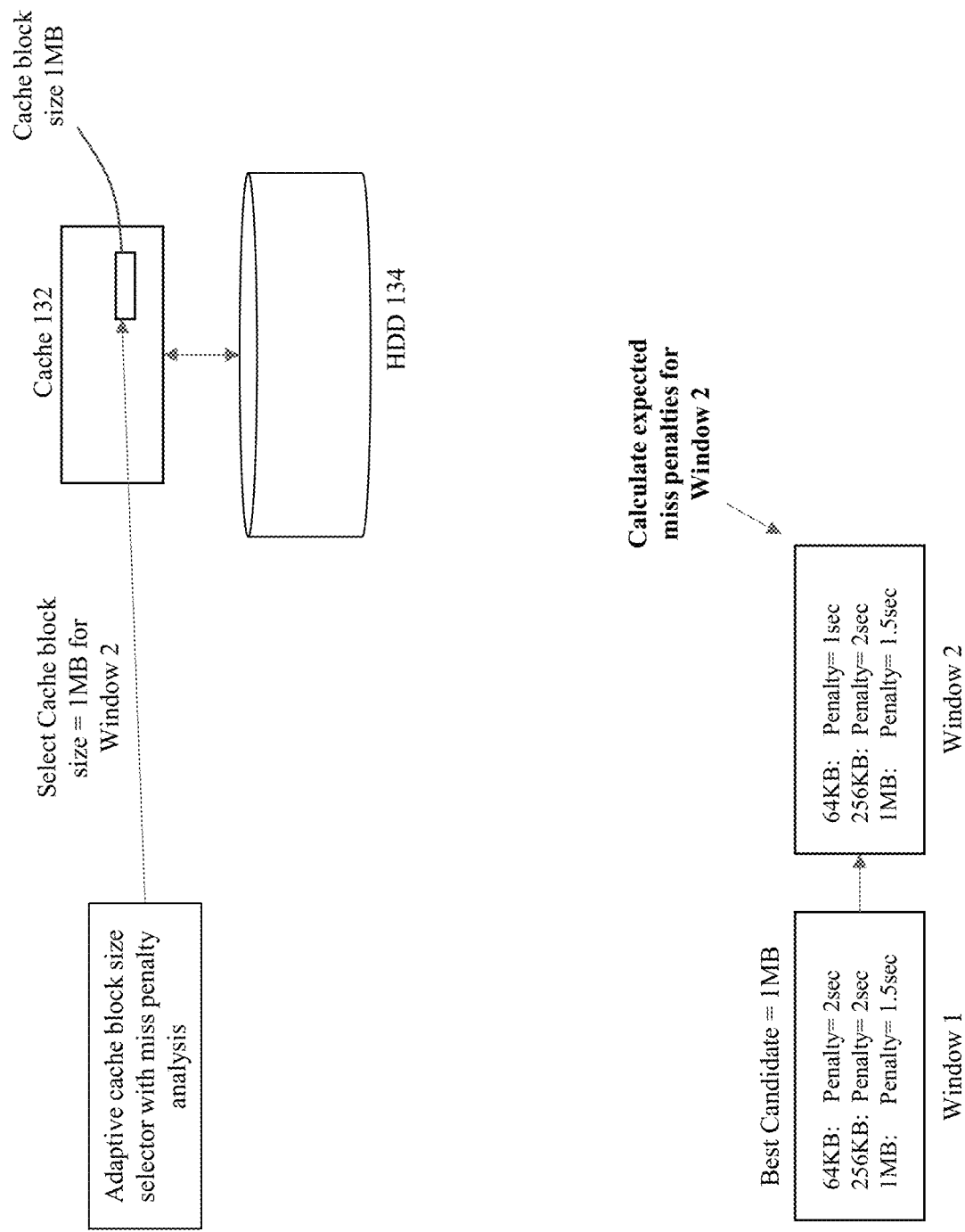

FIG. 4D shows the next time window (Time Window 2), where the same active cache block size of 1 MB is used to process data requests in the system. As shown in FIG. 4E, during processing for data requests in Time Window 2, expected miss penalties are calculated for each of the candidate cache block sizes. In particular, the expected miss penalty for the 64 KB size is 1 second, the expected miss penalty for the 256 KB size is 2 seconds, and the expected miss penalty for the 1 MB size is 1.5 seconds.

Figure 4F:
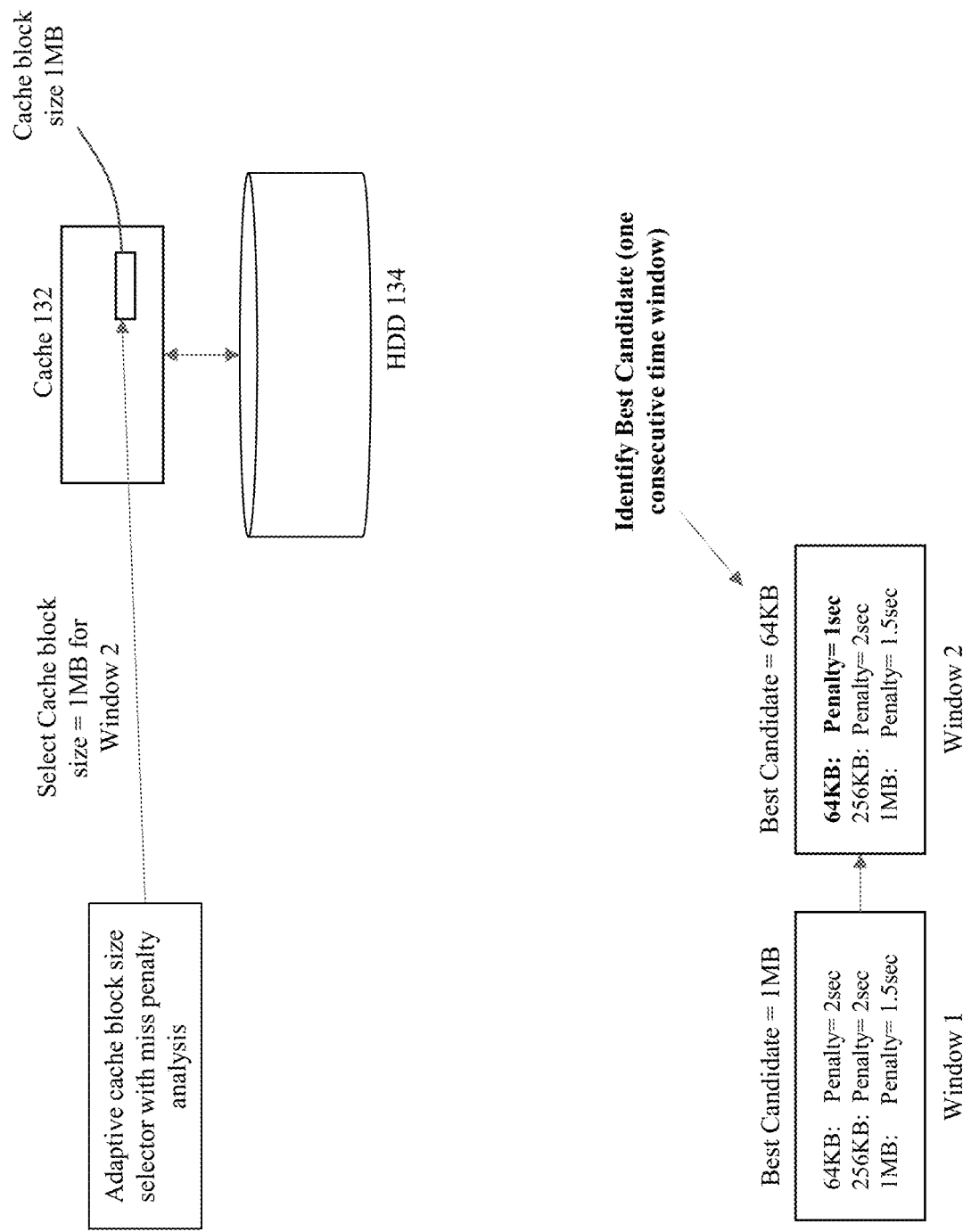

As reflected in FIG. 4F, the expected miss penalty for the 64 KB size is now identified as the lowest penalty for this time period. This indicates that the currently active cache block size (1 MB) is not the best choice for this current time window. Instead, the 64 KB cache block size may be the best block size to use for the cache. However, since there is only a single consecutive time window with this cache block size of 64 KB identified as having the lowest penalty, this means that the active cache block size will not yet be changed. Instead, the system will maintain the current active cache block size and check whether the trend continues before making any changes. As such, this means that nothing further needs to happen for change at this time, except to note the 64 KB value as being the best candidate.

Figure 4G:
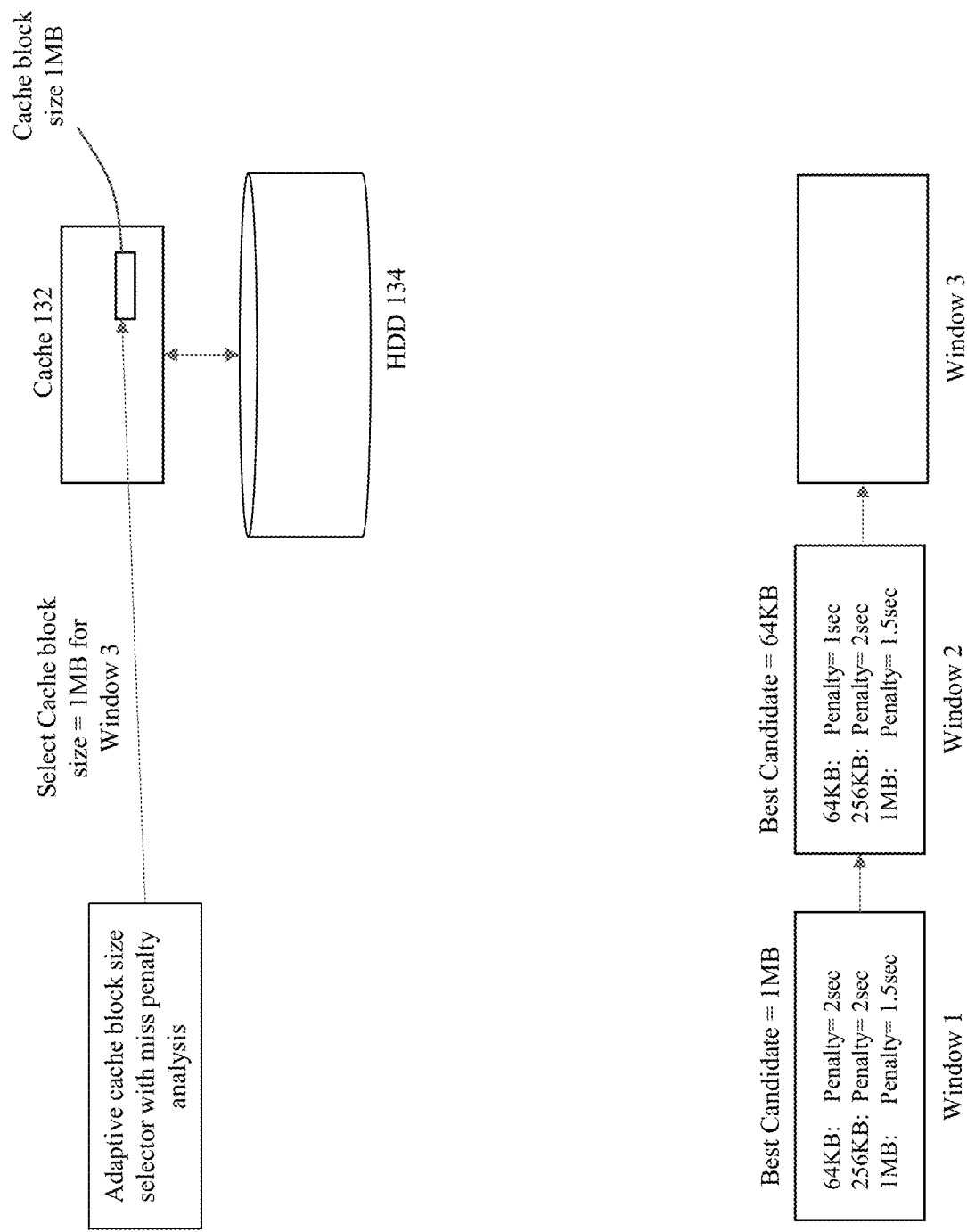
Figure 4H:
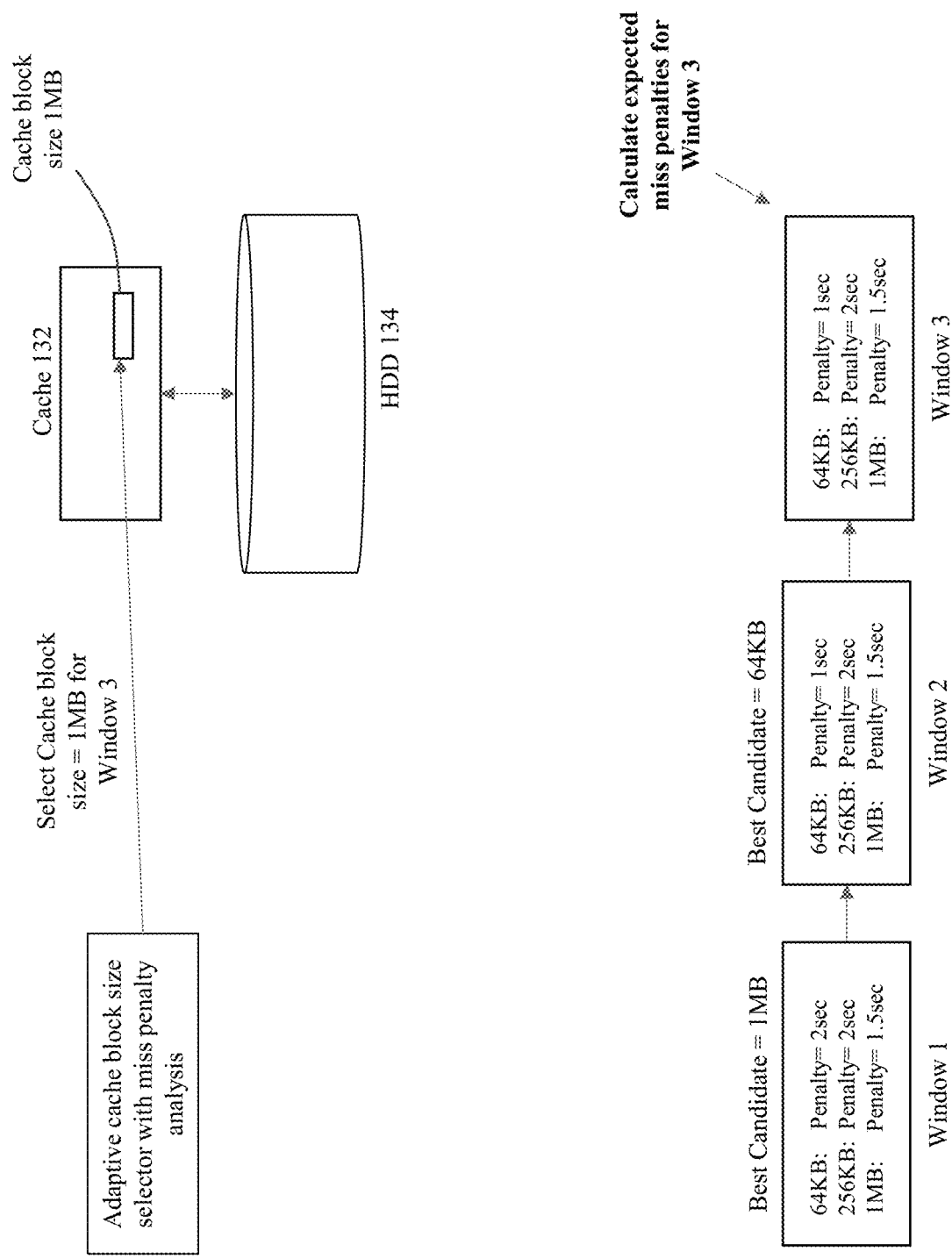

FIG. 4G shows the next time window (Time Window 3), where the same active cache block size of 1 MB is used to process data requests in the system. As shown in FIG. 4H, during processing for data requests in Time Window 3, expected miss penalties are calculated for each of the candidate cache block sizes. The expected miss penalty for the 64 KB size is 1 second, the expected miss penalty for the 256 KB size is 2 seconds, and the expected miss penalty for the 1 MB size is 1.5 seconds.

Figure 4I:
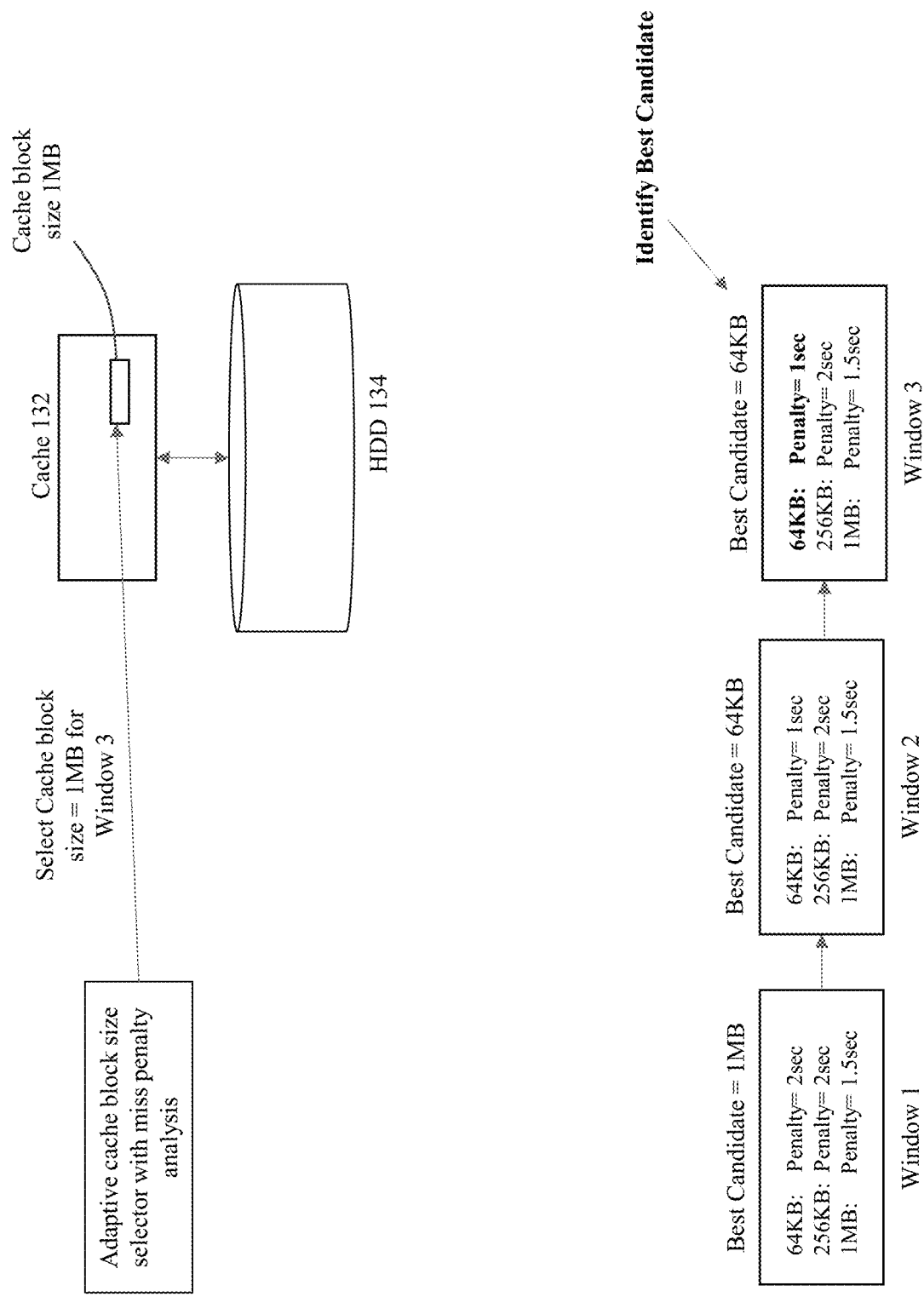

As shown in FIG. 4I, the expected miss penalty for the 64 KB size is identified as the lowest penalty for this time period. This indicates that the 64 KB cache block size may be the best block size to use for the cache.

Figure 4J:
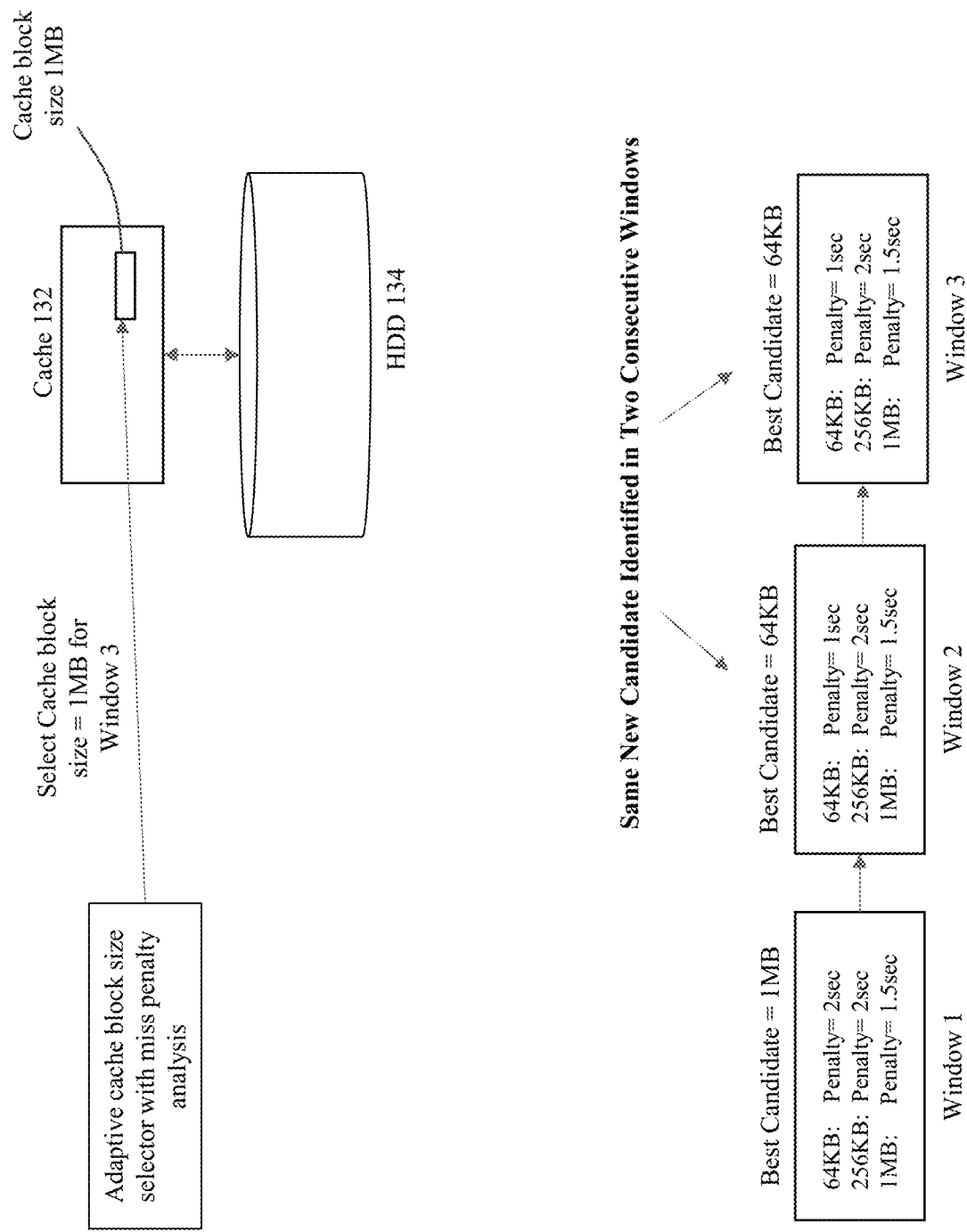
Figure 4K:
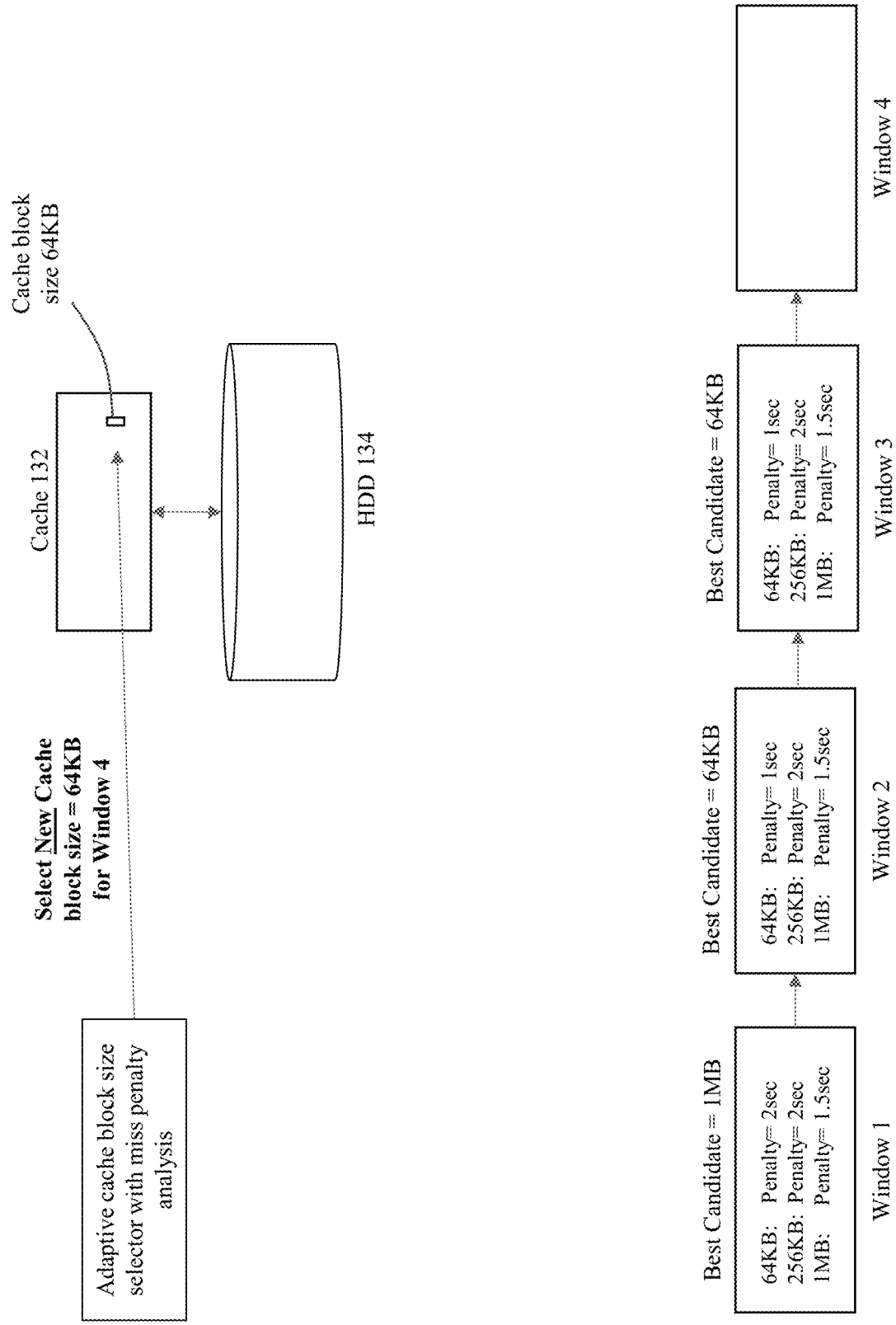

At this point, as shown in FIG. 4J, a determination is made that multiple consecutive time windows have now occurred where the cache block size of 64 KB was identified as having the lowest penalty. Therefore, the system will consider it appropriate to now change the active cache block size from its previous value to the newly identified value. In particular, as shown in FIG. 4K, the system will change the current active cache block size to 64 KB, and begin processing subsequent data requests and contents within cache 132 based upon the new active cache block size of 64 KB.

Therefore, what has been described is an improved approach to implement adaptive selection of a cache block size. Instead, of using fixed block sizes, the current approach permits intelligent selection of a cache block size based upon the determination of a size that will be expected to provide better system performance. Compared with any approaches that use spatial locality-based block size selection, this approach selects the optimal block size based on miss penalty, which is a close indicator of the I/O performance. Moreover, this approach avoids the heavy metadata overhead incurred by having to track the access history on each word, for the purpose of calculating the spatial locality. Finally, this approach can be used together with the existing cache algorithms, yielding additional performance benefit.

According to some embodiments, the approach can adaptively switch to the block size that gives the best I/O performance for the cache management. Some embodiments employ the use of a miss penalty value as the metric for measuring the cache efficiency and switching between the block sizes, where this metric is a direct indicator of the I/O performance. This is unlike other approaches in cache systems that merely use a hit/miss ratio for evaluating the cache efficiency which only determines the IO performance when the block size is fixed, but it does not directly translate to IO performance otherwise.

It is noted that the current invention is new and advantageous over other approaches, especially based upon the calculation and use of each parameter of the expected miss penalty. First, the introduction of the profiling phase for calculating T_miss is new as no other known cache system has introduced such a profiling phase. The profiling phase is applicable to cache systems designed for variable block sizes, which although has received little attention so far, does carry great performance potential. Second, the way the current approach calculates C_miss and C_req is advantageous in that a shadow cache is used for measuring these metrics of candidate block sizes, which instead of loading/evicting the real data blocks, only loads/evicts block IDs, avoiding additional performance penalty.

Indeed, the entire framework described above is quite new and advantageous. This framework divides the timespan of caching into units of time windows, and adaptively monitors the expected miss penalty of a set of candidate block sizes across each time window. The block size that constantly yields the least miss penalty across the last N (2 by default) time windows is promoted to be the active block size. No other known cache system has employed this framework for selecting the optimal parameters and/or block sizes. In addition, this framework is also synergic to the existing cache algorithms.

This approach can therefore adaptively select the block size that yields the best I/O performance, and it can be used together with the existing cache algorithms. Applications could benefit from the existing cache algorithms with the additional performance reward of using adaptive block size.

System Architecture

Figure 5:
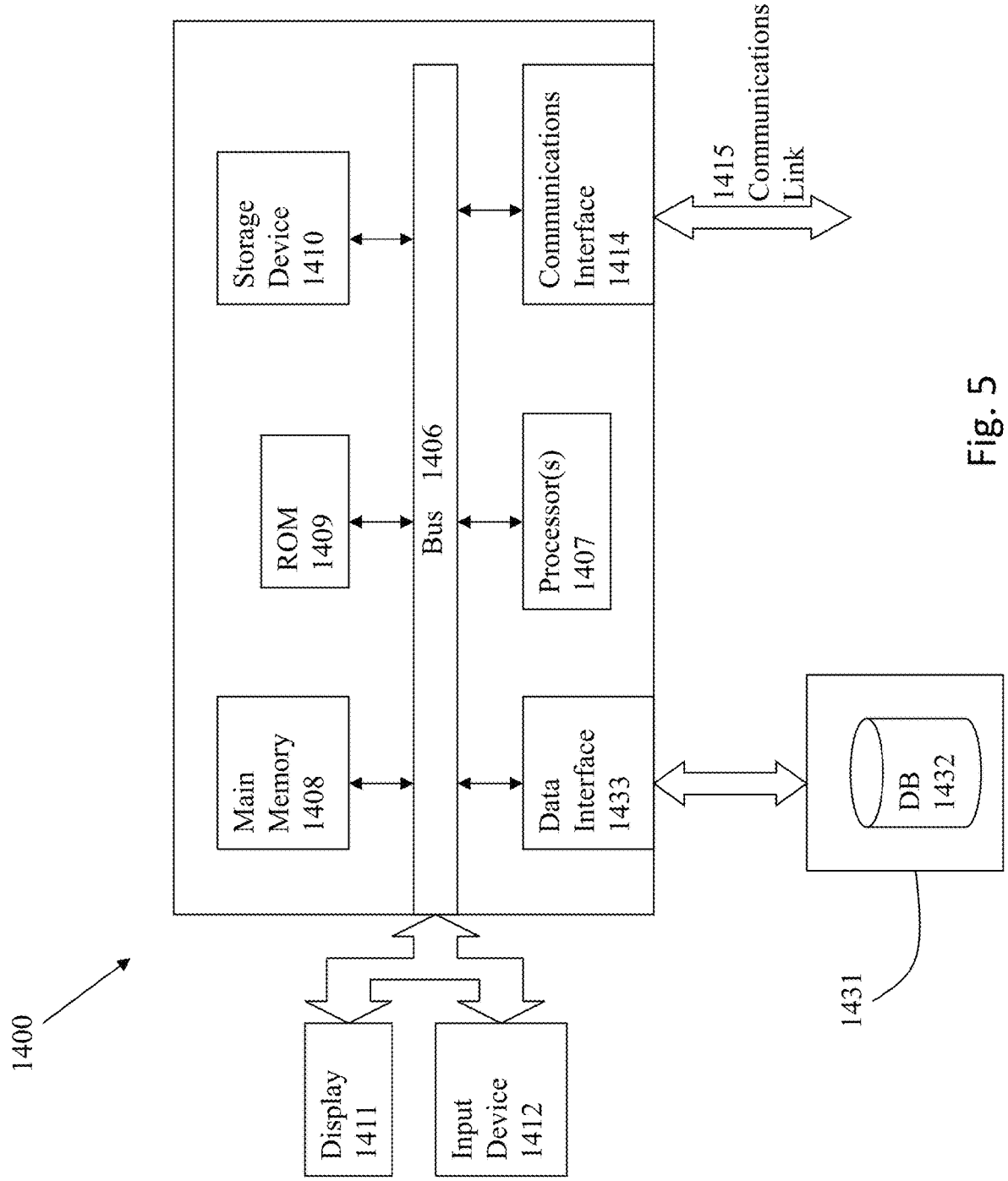
FIG. 5 is a block diagram of an illustrative computing system suitable for implementing an embodiment of the present invention.

FIG. 5 is a block diagram of an illustrative computing system 1400 suitable for implementing an embodiment of the present invention. Computer system 1400 includes a bus 1406 or other communication mechanism for communicating information, which interconnects subsystems and devices, such as processor 1407, system memory 1408 (e.g., RAM), static storage device 1409 (e.g., ROM), disk drive 1410 (e.g., magnetic or optical), communication interface 1414 (e.g., modem or Ethernet card), display 1411 (e.g., CRT or LCD), input device 1412 (e.g., keyboard), and cursor control.

According to some embodiments of the invention, computer system 1400 performs specific operations by processor 1407 executing one or more sequences of one or more instructions contained in system memory 1408. Such instructions may be read into system memory 1408 from another computer readable/usable medium, such as static storage device 1409 or disk drive 1410. In alternative embodiments, hard-wired circuitry may be used in place of or in combination with software instructions to implement the invention. Thus, embodiments of the invention are not limited to any specific combination of hardware circuitry and/or software. In some embodiments, the term "logic" shall mean any combination of software or hardware that is used to implement all or part of the invention.

The term "computer readable medium" or "computer usable medium" as used herein refers to any medium that participates in providing instructions to processor 1407 for execution. Such a medium may take many forms, including but not limited to, non-volatile media and volatile media. Non-volatile media includes, for example, optical or magnetic disks, such as disk drive 1410. Volatile media includes dynamic memory, such as system memory 1408.

Common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer can read.

In an embodiment of the invention, execution of the sequences of instructions to practice the invention is performed by a single computer system 1400. According to other embodiments of the invention, two or more computer systems 1400 coupled by communication link 1410 (e.g., LAN, PTSN, or wireless network) may perform the sequence of instructions required to practice the invention in coordination with one another.

Computer system 1400 may transmit and receive messages, data, and instructions, including program, i.e., application code, through communication link 1415 and communication interface 1414. Received program code may be executed by processor 1407 as it is received, and/or stored in disk drive 1410, or other non-volatile storage for later execution. A database 1432 in a storage medium 1431 may be used to store data accessible by the system 1400.

The techniques described may be implemented using various processing systems, such as clustered computing systems, distributed systems, and cloud computing systems. In some embodiments, some or all of the data processing system described above may be part of a cloud computing system. Cloud computing systems may implement cloud computing services, including cloud communication, cloud storage, and cloud processing.

Figure 6:
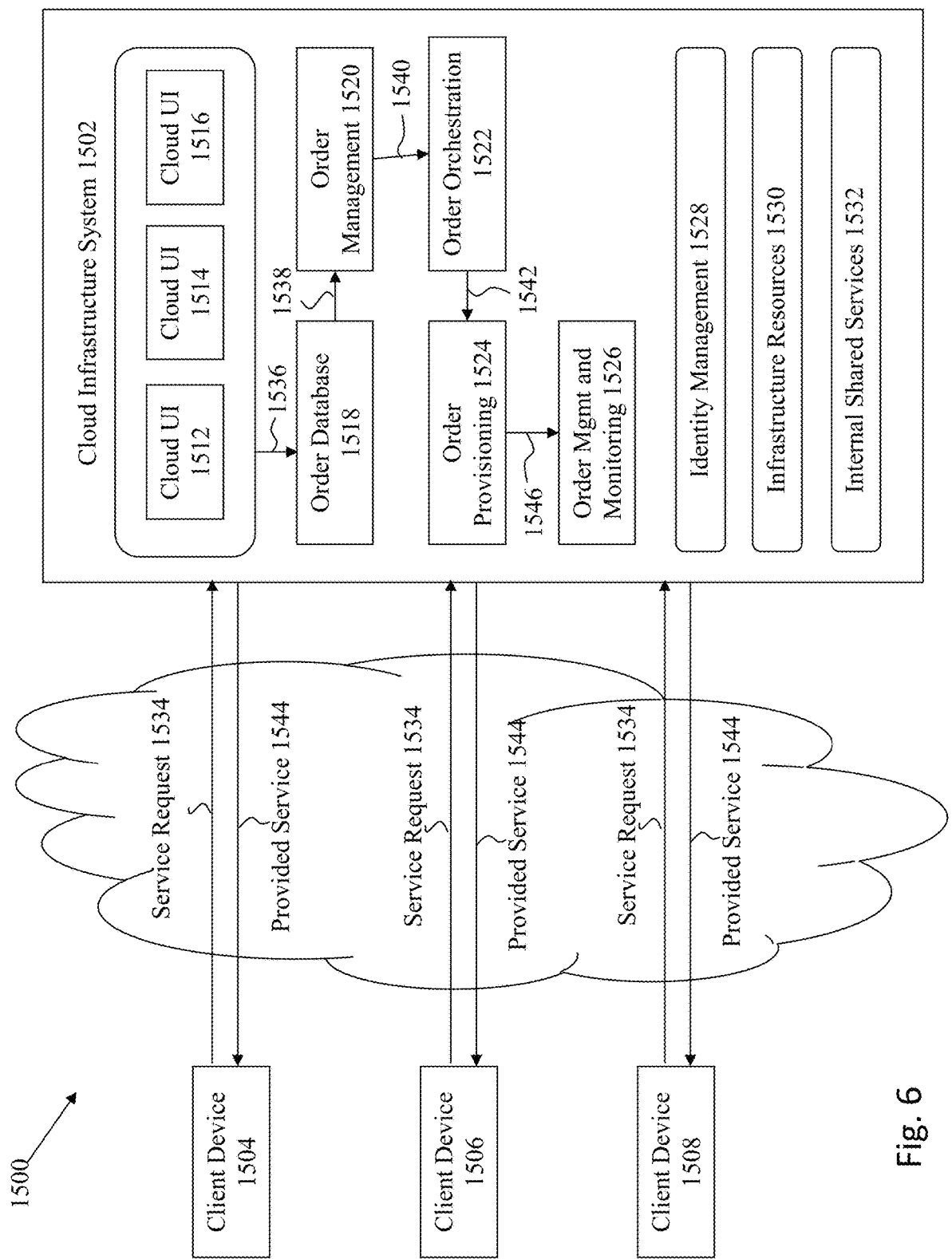
FIG. 6 is a block diagram of one or more components of a system environment in which services may be offered as cloud services, in accordance with an embodiment of the present invention.

FIG. 6 is a simplified block diagram of one or more components of a system environment 1500 by which services provided by one or more components of an embodiment system may be offered as cloud services, in accordance with an embodiment of the present disclosure. In the illustrated embodiment, system environment 1500 includes one or more client computing devices 1504, 1506, and 1508 that may be used by users to interact with a cloud infrastructure system 1502 that provides cloud services. The client computing devices may be configured to operate a client application such as a web browser, a proprietary client application, or some other application, which may be used by a user of the client computing device to interact with cloud infrastructure system 1502 to use services provided by cloud infrastructure system 1502.

It should be appreciated that cloud infrastructure system 1502 depicted in the figure may have other components than those depicted. Further, the embodiment shown in the figure is only one example of a cloud infrastructure system that may incorporate an embodiment of the invention. In some other embodiments, cloud infrastructure system 1502 may have more or fewer components than shown in the figure, may combine two or more components, or may have a different configuration or arrangement of components.

Client computing devices 1504, 1506, and 1508 may be devices similar to those described above for FIG. 5. Although system environment 1500 is shown with three client computing devices, any number of client computing devices may be supported. Other devices such as devices with sensors, etc. may interact with cloud infrastructure system 1502.

Network(s) 1510 may facilitate communications and exchange of data between clients 1504, 1506, and 1508 and cloud infrastructure system 1502. Each network may be any type of network familiar to those skilled in the art that can support data communications using any of a variety of commercially-available protocols. Cloud infrastructure system 1502 may comprise one or more computers and/or servers.

In certain embodiments, services provided by the cloud infrastructure system may include a host of services that are made available to users of the cloud infrastructure system on demand, such as online data storage and backup solutions, Web-based e-mail services, hosted office suites and document collaboration services, database processing, managed technical support services, and the like. Services provided by the cloud infrastructure system can dynamically scale to meet the needs of its users. A specific instantiation of a service provided by cloud infrastructure system is referred to herein as a "service instance." In general, any service made available to a user via a communication network, such as the Internet, from a cloud service provider's system is referred to as a "cloud service." Typically, in a public cloud environment, servers and systems that make up the cloud service provider's system are different from the customer's own on-premises servers and systems. For example, a cloud service provider's system may host an application, and a user may, via a communication network such as the Internet, on demand, order and use the application.

In some examples, a service in a computer network cloud infrastructure may include protected computer network access to storage, a hosted database, a hosted web server, a software application, or other service provided by a cloud vendor to a user, or as otherwise known in the art. For example, a service can include password-protected access to remote storage on the cloud through the Internet. As another example, a service can include a web service-based hosted relational database and a script-language middleware engine for private use by a networked developer. As another example, a service can include access to an email software application hosted on a cloud vendor's web site.

In certain embodiments, cloud infrastructure system 1502 may include a suite of applications, middleware, and database service offerings that are delivered to a customer in a self-service, subscription-based, elastically scalable, reliable, highly available, and secure manner.

In various embodiments, cloud infrastructure system 1502 may be adapted to automatically provision, manage and track a customer's subscription to services offered by cloud infrastructure system 1502. Cloud infrastructure system 1502 may provide the cloud services via different deployment models. For example, services may be provided under a public cloud model in which cloud infrastructure system 1502 is owned by an organization selling cloud services and the services are made available to the general public or different industry enterprises. As another example, services may be provided under a private cloud model in which cloud infrastructure system 1502 is operated solely for a single organization and may provide services for one or more entities within the organization. The cloud services may also be provided under a community cloud model in which cloud infrastructure system 1502 and the services provided by cloud infrastructure system 1502 are shared by several organizations in a related community. The cloud services may also be provided under a hybrid cloud model, which is a combination of two or more different models.

In some embodiments, the services provided by cloud infrastructure system 1502 may include one or more services provided under Software as a Service (SaaS) category, Platform as a Service (PaaS) category, Infrastructure as a Service (IaaS) category, or other categories of services including hybrid services. A customer, via a subscription order, may order one or more services provided by cloud infrastructure system 1502. Cloud infrastructure system 1502 then performs processing to provide the services in the customer's subscription order.

In some embodiments, the services provided by cloud infrastructure system 1502 may include, without limitation, application services, platform services and infrastructure services. In some examples, application services may be provided by the cloud infrastructure system via a SaaS platform. The SaaS platform may be configured to provide cloud services that fall under the SaaS category. For example, the SaaS platform may provide capabilities to build and deliver a suite of on-demand applications on an integrated development and deployment platform. The SaaS platform may manage and control the underlying software and infrastructure for providing the SaaS services. By utilizing the services provided by the SaaS platform, customers can utilize applications executing on the cloud infrastructure system. Customers can acquire the application services without the need for customers to purchase separate licenses and support. Various different SaaS services may be provided. Examples include, without limitation, services that provide solutions for sales performance management, enterprise integration, and business flexibility for large organizations.

In some embodiments, platform services may be provided by the cloud infrastructure system via a PaaS platform. The PaaS platform may be configured to provide cloud services that fall under the PaaS category. Examples of platform services may include without limitation services that enable organizations to consolidate existing applications on a shared, common architecture, as well as the ability to build new applications that leverage the shared services provided by the platform. The PaaS platform may manage and control the underlying software and infrastructure for providing the PaaS services. Customers can acquire the PaaS services provided by the cloud infrastructure system without the need for customers to purchase separate licenses and support.

By utilizing the services provided by the PaaS platform, customers can employ programming languages and tools supported by the cloud infrastructure system and also control the deployed services. In some embodiments, platform services provided by the cloud infrastructure system may include database cloud services, middleware cloud services, and Java cloud services. In one embodiment, database cloud services may support shared service deployment models that enable organizations to pool database resources and offer customers a Database as a Service in the form of a database cloud. Middleware cloud services may provide a platform for customers to develop and deploy various business applications, and Java cloud services may provide a platform for customers to deploy Java applications, in the cloud infrastructure system.

Various different infrastructure services may be provided by an IaaS platform in the cloud infrastructure system. The infrastructure services facilitate the management and control of the underlying computing resources, such as storage, networks, and other fundamental computing resources for customers utilizing services provided by the SaaS platform and the PaaS platform.

In certain embodiments, cloud infrastructure system 1502 may also include infrastructure resources 1530 for providing the resources used to provide various services to customers of the cloud infrastructure system. In one embodiment, infrastructure resources 1530 may include pre-integrated and optimized combinations of hardware, such as servers, storage, and networking resources to execute the services provided by the PaaS platform and the SaaS platform.

In some embodiments, resources in cloud infrastructure system 1502 may be shared by multiple users and dynamically re-allocated per demand. Additionally, resources may be allocated to users in different time zones. For example, cloud infrastructure system 1502 may enable a first set of users in a first time zone to utilize resources of the cloud infrastructure system for a specified number of hours and then enable the re-allocation of the same resources to another set of users located in a different time zone, thereby maximizing the utilization of resources.

In certain embodiments, a number of internal shared services 1532 may be provided that are shared by different components or modules of cloud infrastructure system 1502 and by the services provided by cloud infrastructure system 1502. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

In certain embodiments, cloud infrastructure system 1502 may provide comprehensive management of cloud services (e.g., SaaS, PaaS, and IaaS services) in the cloud infrastructure system. In one embodiment, cloud management functionality may include capabilities for provisioning, managing and tracking a customer's subscription received by cloud infrastructure system 1502, and the like.

In one embodiment, as depicted in the figure, cloud management functionality may be provided by one or more modules, such as an order management module 1520, an order orchestration module 1522, an order provisioning module 1524, an order management and monitoring module 1526, and an identity management module 1528. These modules may include or be provided using one or more computers and/or servers, which may be general purpose computers, specialized server computers, server farms, server clusters, or any other appropriate arrangement and/or combination.

In operation 1534, a customer using a client device, such as client device 1504, 1506 or 1508, may interact with cloud infrastructure system 1502 by requesting one or more services provided by cloud infrastructure system 1502 and placing an order for a subscription for one or more services offered by cloud infrastructure system 1502. In certain embodiments, the customer may access a cloud User Interface (UI), cloud UI 1512, cloud UI 1514 and/or cloud UI 1516 and place a subscription order via these UIs. The order information received by cloud infrastructure system 1502 in response to the customer placing an order may include information identifying the customer and one or more services offered by the cloud infrastructure system 1502 that the customer intends to subscribe to.

After an order has been placed by the customer, the order information is received via the cloud UIs, 1512, 1514 and/or 1516. At operation 1536, the order is stored in order database 1518. Order database 1518 can be one of several databases operated by cloud infrastructure system 1518 and operated in conjunction with other system elements. At operation 1538, the order information is forwarded to an order management module 1520. In some instances, order management module 1520 may be configured to perform billing and accounting functions related to the order, such as verifying the order, and upon verification, booking the order. At operation 1540, information regarding the order is communicated to an order orchestration module 1522. Order orchestration module 1522 may utilize the order information to orchestrate the provisioning of services and resources for the order placed by the customer. In some instances, order orchestration module 1522 may orchestrate the provisioning of resources to support the subscribed services using the services of order provisioning module 1524.

In certain embodiments, order orchestration module 1522 enables the management of business processes associated with each order and applies business logic to determine whether an order should proceed to provisioning. At operation 1542, upon receiving an order for a new subscription, order orchestration module 1522 sends a request to order provisioning module 1524 to allocate resources and configure those resources needed to fulfill the subscription order.

Order provisioning module 1524 enables the allocation of resources for the services ordered by the customer. Order provisioning module 1524 provides a level of abstraction between the cloud services provided by cloud infrastructure system 1502 and the physical implementation layer that is used to provision the resources for providing the requested services. Order orchestration module 1522 may thus be isolated from implementation details, such as whether or not services and resources are actually provisioned on the fly or pre-provisioned and only allocated/assigned upon request.

At operation 1544, once the services and resources are provisioned, a notification of the provided service may be sent to customers on client devices 1504, 1506 and/or 1508 by order provisioning module 1524 of cloud infrastructure system 1502.

At operation 1546, the customer's subscription order may be managed and tracked by an order management and monitoring module 1526. In some instances, order management and monitoring module 1526 may be configured to collect usage statistics for the services in the subscription order, such as the amount of storage used, the amount data transferred, the number of users, and the amount of system up time and system down time.

In certain embodiments, cloud infrastructure system 1502 may include an identity management module 1528. Identity management module 1528 may be configured to provide identity services, such as access management and authorization services in cloud infrastructure system 1502. In some embodiments, identity management module 1528 may control information about customers who wish to utilize the services provided by cloud infrastructure system 1502. Such information can include information that authenticates the identities of such customers and information that describes which actions those customers are authorized to perform relative to various system resources (e.g., files, directories, applications, communication ports, memory segments, etc.) Identity management module 1528 may also include the management of descriptive information about each customer and about how and by whom that descriptive information can be accessed and modified.

In the foregoing specification, the invention has been described with reference to specific embodiments thereof. It will, however, be evident that various modifications and changes may be made thereto without departing from the broader spirit and scope of the invention. For example, the above-described process flows are described with reference to a particular ordering of process actions. However, the ordering of many of the described process actions may be changed without affecting the scope or operation of the invention. The specification and drawings are, accordingly, to be regarded in an illustrative rather than restrictive sense.

What is claimed is:

1. A method, comprising:
analyzing data requests for data within a storage system, the storage system comprising a cache;
determining a miss penalty value for a plurality of candidate cache units respectively for the cache, wherein a candidate cache unit comprises a different number of simulated or dummy disk blocks so that the plurality of candidate cache units respectively corresponds to different candidate cache unit sizes; and
adaptively identifying an active cache unit size for the cache based at least in part on the miss penalty values determined for the plurality of candidate cache units, wherein
a dummy cache comprising the different number of simulated or dummy disk blocks is maintained for each candidate cache unit of the plurality of candidate cache units,
the miss penalty value is determined based at least in part upon an expected penalty for a cache miss or cache hit that is determined using the dummy cache, and
the dummy cache includes block ID (identification) values respectively corresponding to the different number of simulated or dummy disk blocks so that during adaptively identifying the active cache unit size, a first block ID is loaded into the dummy cache to simulate a cache miss, and a second block ID is evicted from the dummy cache to simulate a cache hit, instead of loading full data associated with the block ID values into the dummy cache.

2. The method of claim 1, wherein the miss penalty value is determined for a time window, where the time window corresponds to a cache size and a request data size.

3. The method of claim 2, wherein the active cache unit size is identified based at least upon a candidate cache unit size having a lowest miss penalty value for n consecutive time windows, where n>=2.

4. The method of claim 1, wherein the miss penalty value is determined based at least upon a miss count and a request count for a time window.

5. The method of claim 1, wherein the miss penalty value is determined based at least upon a miss time value associated with a time cost for loading data from a slower storage layer into the cache.

6. The method of claim 5, wherein a profiling phase is used to determine the miss time value based at least in part on a quotient of an accumulated miss time and a miss count.

7. A system, comprising:
a processor;
a memory for holding programmable code; and
wherein the programmable code includes instructions executable by the processor for performing a set of acts, the set of acts comprising:
analyzing data requests for data within a storage system, the storage system comprising a cache;
determining a miss penalty value for a plurality of candidate cache units respectively for the cache, wherein
a candidate cache unit comprises a different number of simulated or dummy disk blocks so that the plurality of candidate cache units respectively corresponds to different candidate cache unit sizes; and
adaptively identifying an active cache unit size for the cache based at least in part on the miss penalty value determined for the plurality of candidate cache units, wherein
a dummy cache comprising the different number of simulated or dummy disk blocks is maintained for each candidate cache unit of the plurality of candidate cache units,
the miss penalty value is determined based at least in part upon an expected penalty for a cache miss or cache hit that is determined using the dummy cache, and
the dummy cache includes block ID (identification) values respectively corresponding to the different number of simulated or dummy disk blocks so that during adaptively identifying the active cache unit size, a first block ID is loaded into the dummy cache to simulate a cache miss, and a second block ID is evicted from the dummy cache to simulate a cache hit, instead of loading full data associated with the block ID values into the dummy cache.

8. The system of claim 7, wherein the miss penalty value is determined for a time window, where the time window corresponds to a cache size and a request data size.

9. The system of claim 8, wherein the active cache unit size is identified based at least upon a candidate cache unit size having a lowest miss penalty value for n consecutive time windows, where n>=2.

10. The system of claim 7, wherein the miss penalty value is determined based at least upon a miss count and a request count for a time window.

11. The system of claim 7, wherein the miss penalty value is determined based at least upon a miss time value associated with a time cost for loading data from a slower storage layer into the cache.

12. The system of claim 11, wherein a profiling phase is used to determine the miss time value based at least in part on a quotient of an accumulated miss time and a miss count.

13. A computer program product embodied on a non-transitory computer readable medium, the non-transitory computer readable medium having stored thereon a sequence of instructions which, when executed by a processor, causes the processor to execute at least a set of acts, the set of acts comprising:
analyzing data requests for data within a storage system, the storage system comprising a cache;
determining a miss penalty value for a plurality of candidate cache units respectively for the cache, wherein a candidate cache unit comprises a different number of simulated or dummy disk blocks so that the plurality of candidate cache units respectively corresponds to different candidate cache unit sizes; and
adaptively identifying an active cache unit size for the cache based at least in part on the miss penalty value determined for the plurality of candidate cache units, wherein a dummy cache comprising the different number of simulated or dummy disk blocks is maintained for each candidate cache unit of the plurality of candidate cache units,
the miss penalty value is determined based at least in part upon an expected penalty for a cache miss or cache hit that is determined using the dummy cache, and
the dummy cache includes block ID (identification) values respectively corresponding to the different number of simulated or dummy disk blocks so that during adaptively identifying the active cache unit size, a first block ID is loaded into the dummy cache to simulate a cache miss, and a second block ID is evicted from the dummy cache to simulate a cache hit, instead of loading full data associated with the block ID values into the dummy cache.

14. The computer program product of claim 13, wherein the miss penalty value is determined for a time window, where the time window corresponds to a cache size and a request data size.

15. The computer program product of claim 14, wherein the active cache unit size is identified based at least upon a candidate cache unit size having a lowest miss penalty value for n consecutive time windows, where n>=2.

16. The computer program product of claim 13, wherein the miss penalty value is determined based at least upon a miss count and a request count for a time window.

17. The computer program product of claim 13, wherein the miss penalty value is determined based at least upon a miss time value associated with a time cost for loading data from a slower storage layer into the cache.

18. The computer program product of claim 17, wherein a profiling phase is used to determine the miss time value based at least in part on a quotient of an accumulated miss time and a miss count.

* * * * *